US011254247B2

(12) United States Patent
Jun et al.

(10) Patent No.: US 11,254,247 B2
(45) Date of Patent: Feb. 22, 2022

(54) LUMBAR SUPPORT ASSEMBLY

(71) Applicant: DAECHANG SEAT CO., LTD—DONGTAN, Hwaseong-si (KR)

(72) Inventors: Hun Yeong Jun, Hwaseong-si (KR); Hyun Chul Woo, Bucheon-si (KR); Lyang Sun Kim, Suwon-si (KR); Jin Oh Kim, Osan-si (KR); Chan Ki Cho, Gwangju (KR)

(73) Assignee: DAECHANG SEAT CO., LTD-DONGTAN, Hwaseong-si (KR)

( * ) Notice: Subject to any disclaimer, the term of this patent is extended or adjusted under 35 U.S.C. 154(b) by 0 days.

(21) Appl. No.: 15/930,002

(22) Filed: May 12, 2020

(65) Prior Publication Data

US 2020/0376993 A1 Dec. 3, 2020

(30) Foreign Application Priority Data

May 31, 2019 (KR) ........................ 10-2019-0064562

(51) Int. Cl.
*B60N 2/66* (2006.01)
*A47C 7/46* (2006.01)

(52) U.S. Cl.
CPC ................ *B60N 2/66* (2013.01); *A47C 7/462* (2013.01)

(58) Field of Classification Search
CPC ......... B60N 2/66; B60N 2/667; B60N 2/6673
(Continued)

(56) References Cited

U.S. PATENT DOCUMENTS 5,217,278 A * 6/1993 Harrison .............. B60N 2/0296 297/284.4 X
5,462,335 A * 10/1995 Seyler ...................... B60N 2/66 297/284.4

(Continued)

FOREIGN PATENT DOCUMENTS

DE 102005036774 A1 2/2007
EP 3075600 A1 10/2016

(Continued)

OTHER PUBLICATIONS

Korean Office Action dated May 25, 2020 for corresponding Korean patent application No. 10-2019-0064562.

(Continued)

*Primary Examiner* — Rodney B White
(74) *Attorney, Agent, or Firm* — Tarolli, Sundheim, Covell & Tummino LLP

(57) ABSTRACT

The disclosure relates to a lumbar support assembly, wherein the inclination of a mat is controlled by upward and downward movement of a single nut, thereby making it possible to reducing weight and manufacturing cost of the assembly. According to one embodiment of disclosed herein, a lumbar support assembly includes: a mat having opposite sides that are rotatably connected to opposite sides of a seat frame, respectively; a driving unit coupled to the mat, and including a nut that is configured to be moved upward and downward; and a tension unit having first and second sides that are respectively coupled to the first and second sides of the seat frame, and coupled to the nut while surrounding a rear portion of the mat, wherein the nut allows the mat to be moved frontward or rearward by pulling or loosening the tension unit according to direction of movement.

5 Claims, 8 Drawing Sheets

(58) Field of Classification Search
USPC ........................................................ 297/284.4
See application file for complete search history.

(56) References Cited

U.S. PATENT DOCUMENTS

| | | | | | |
|---|---|---|---|---|---|
| 6,050,641 | A * | 4/2000 | Benson | B60N 2/66 | 297/284.4 |
| 6,227,618 | B1 * | 5/2001 | Ligon, Sr. | B60N 2/66 | 297/284.4 |
| 7,770,972 | B2 * | 8/2010 | Popa | B60N 2/0296 | 297/284.4 |
| 8,091,966 | B2 * | 1/2012 | Schweizer | B60N 2/6673 | 297/284.8 |
| 8,091,967 | B2 * | 1/2012 | Schweizer | B60N 2/0232 | 297/284.8 |
| 8,360,523 | B2 * | 1/2013 | Maierhofer | B60N 2/66 | 297/284.4 |
| 8,544,954 | B2 * | 10/2013 | Maierhofer | A47C 7/465 | 297/284.4 |
| 8,991,923 | B2 * | 3/2015 | Maierhofer | B60N 2/666 | 297/284.4 |
| 9,004,594 | B2 * | 4/2015 | Hong | B60N 2/66 | 297/284.4 |
| 9,254,768 | B2 * | 2/2016 | Hong | B60N 2/6673 | |
| 9,604,559 | B2 * | 3/2017 | Yoo | B60N 2/666 | |
| 9,744,891 | B2 * | 8/2017 | Cho | B60N 2/6673 | |
| 9,975,460 | B2 * | 5/2018 | Bhatia | B60N 2/666 | |
| 10,427,569 | B2 | 10/2019 | Ellis | | |
| 10,814,753 | B2 * | 10/2020 | Eichhorn | B60N 2/99 | |
| 2013/0334853 | A1 | 12/2013 | Samain | | |
| 2014/0125103 | A1 * | 5/2014 | Suzuki | B60N 2/6673 | 297/284.4 X |
| 2017/0050548 | A1 * | 2/2017 | Samain | B60N 2/66 | |

FOREIGN PATENT DOCUMENTS

| | | | |
|---|---|---|---|
| JP | 2016-196283 | A | 11/2016 |
| KR | 10-2007-0054282 | A | 5/2007 |
| KR | 10-1545928 | B | 8/2015 |
| KR | 10-1598960 | B1 | 3/2016 |
| KR | 10-1664949 | B | 10/2016 |
| KR | 10-1664949 | B1 | 10/2016 |
| KR | 10-1725413 | B1 | 4/2017 |
| KR | 10-2096378 | B1 | 4/2020 |
| WO | 3517840 | A1 | 7/1995 |
| WO | 2015128012 | A1 | 9/2015 |

OTHER PUBLICATIONS

Decision to Grant a Patent issued by the Korean Intellectual Property Office dated Mar. 24, 2021 for corresponding Korean patent application No. 10-2019-0064562.

Decision of Refusal issued by the Japanese Patent Office dated Apr. 22, 2021 for corresponding JP patent application No. 2020-082776.

Office Action issued by the German Patent Office dated Mar. 26, 2021 for corresponding DE patent application No. 102020206065.7.

* cited by examiner

[Fig. 1]
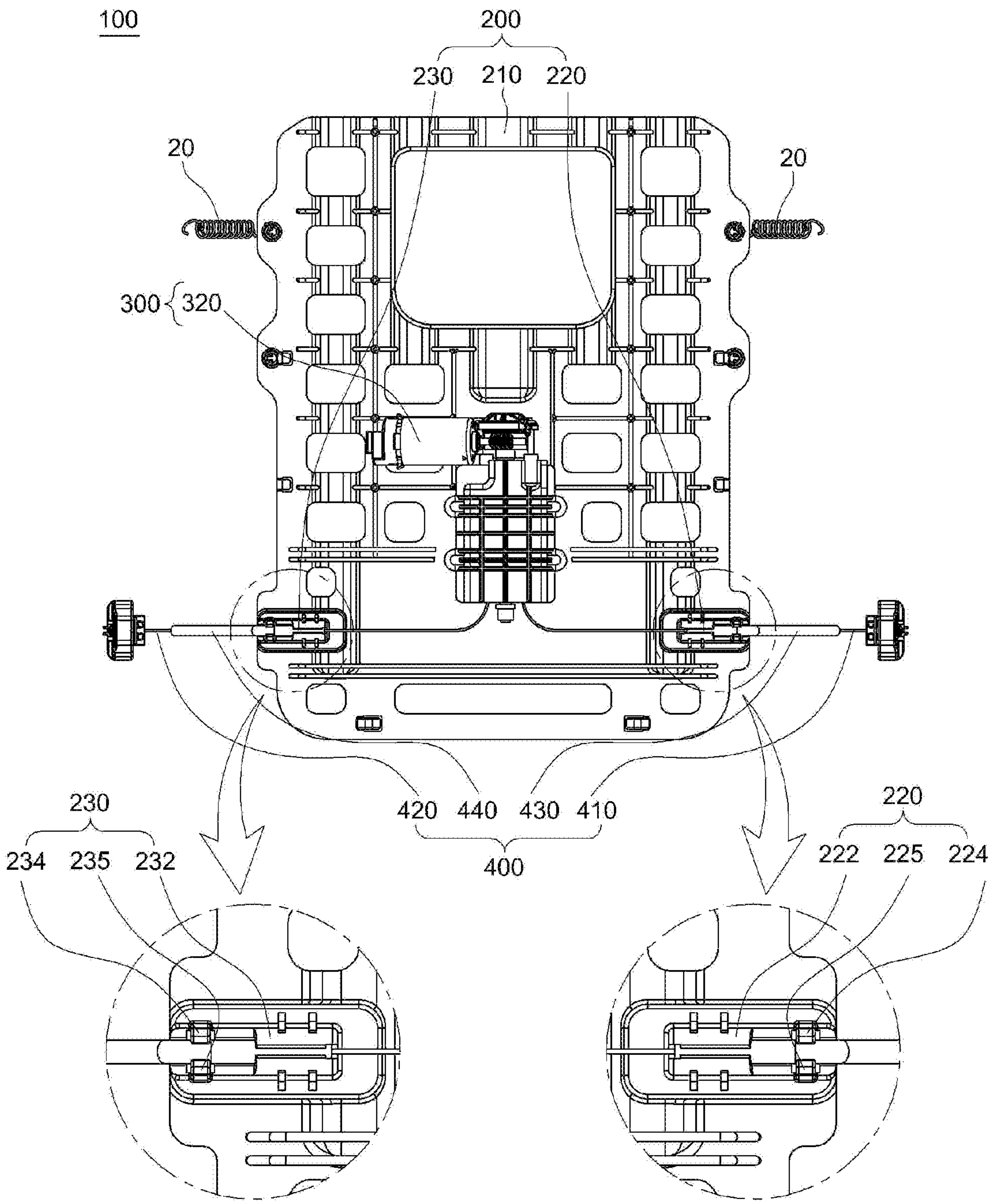

[Fig. 2]
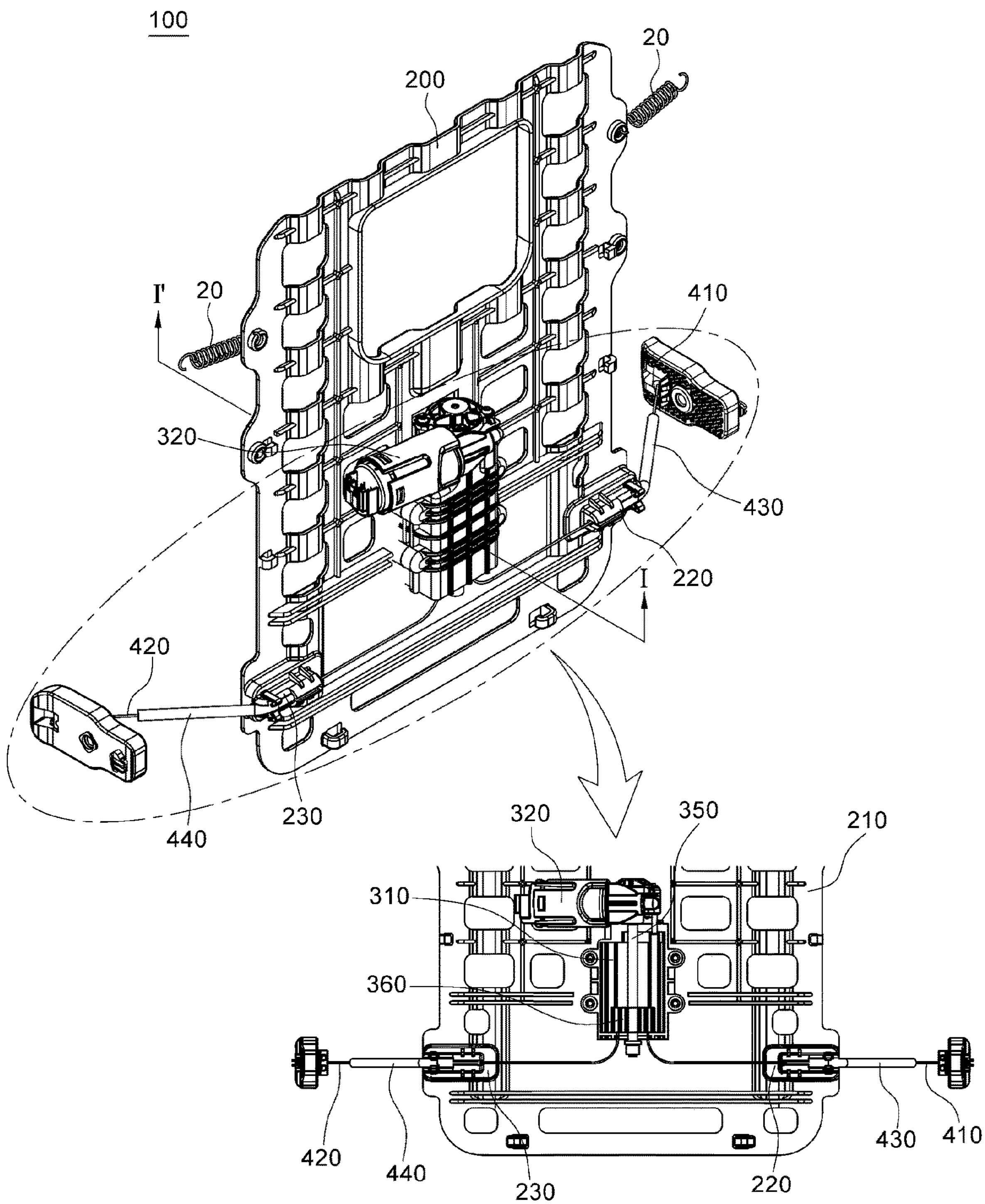

[Fig. 3]
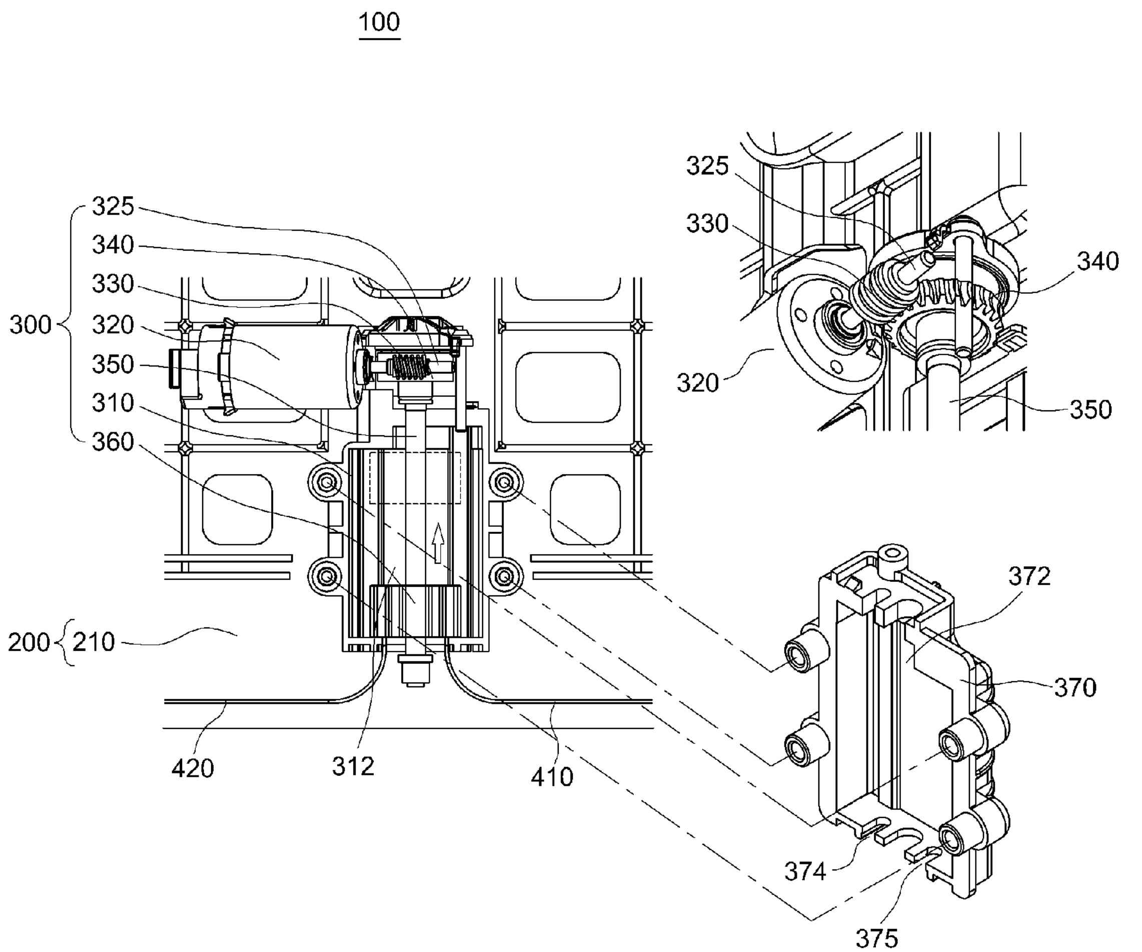

[Fig. 4]
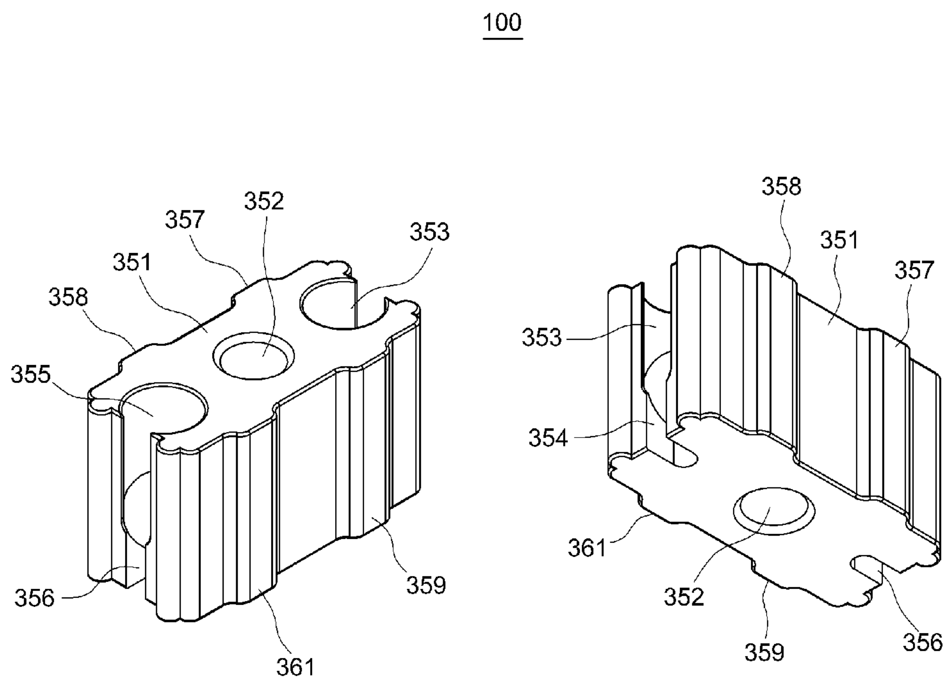

[Fig. 5]
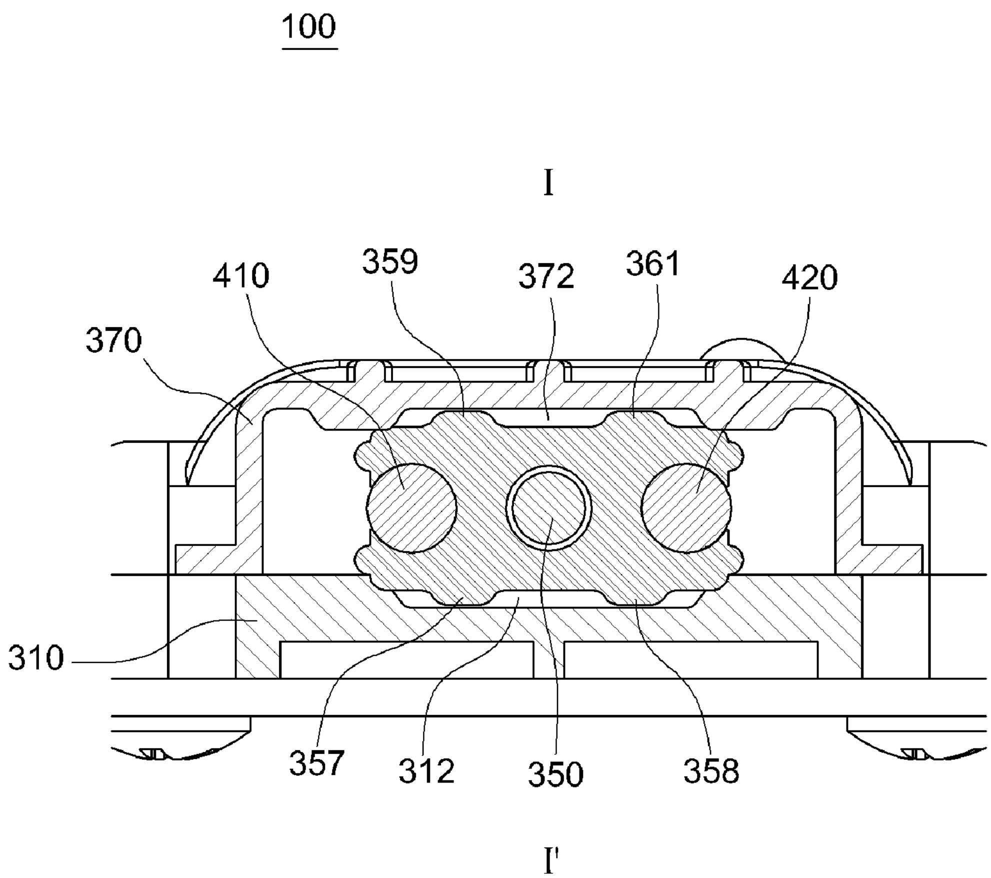

[Fig. 6]
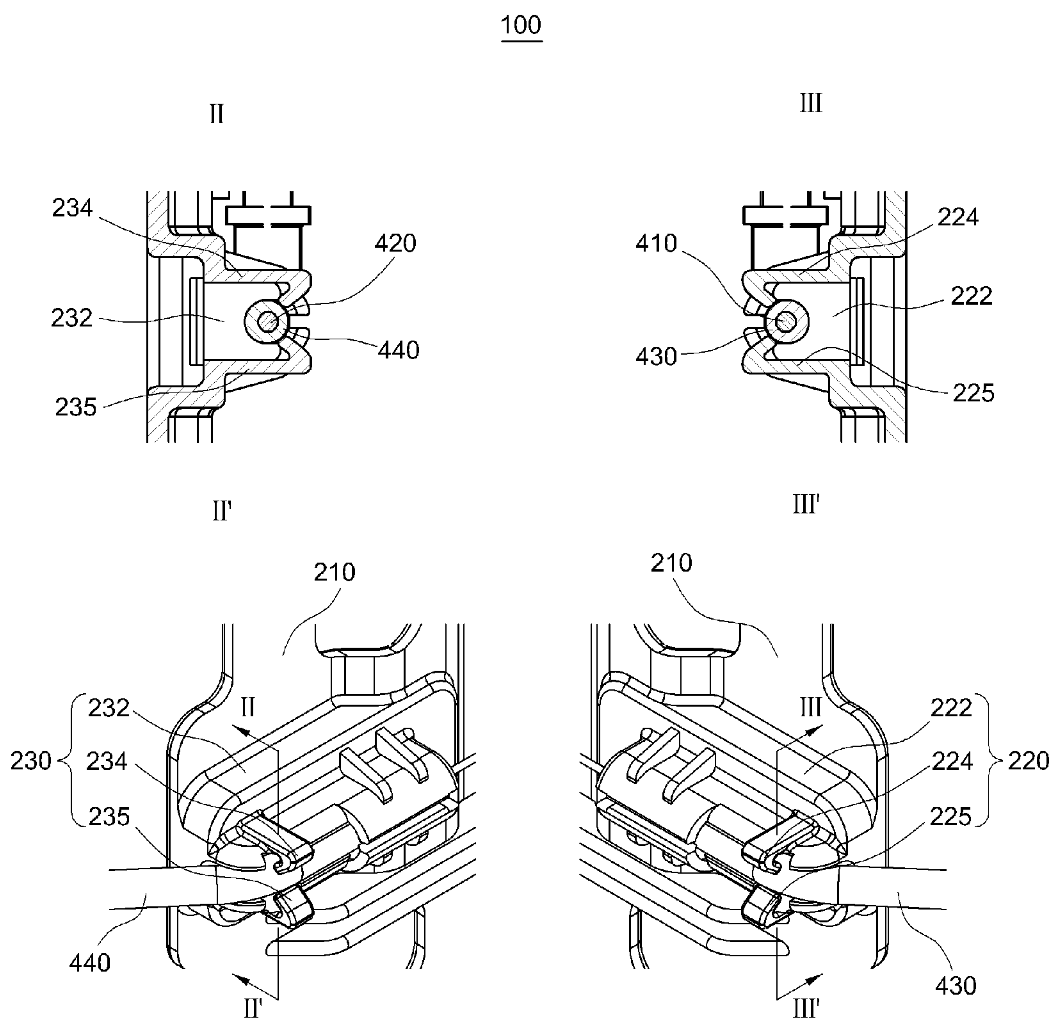

[Fig. 7]
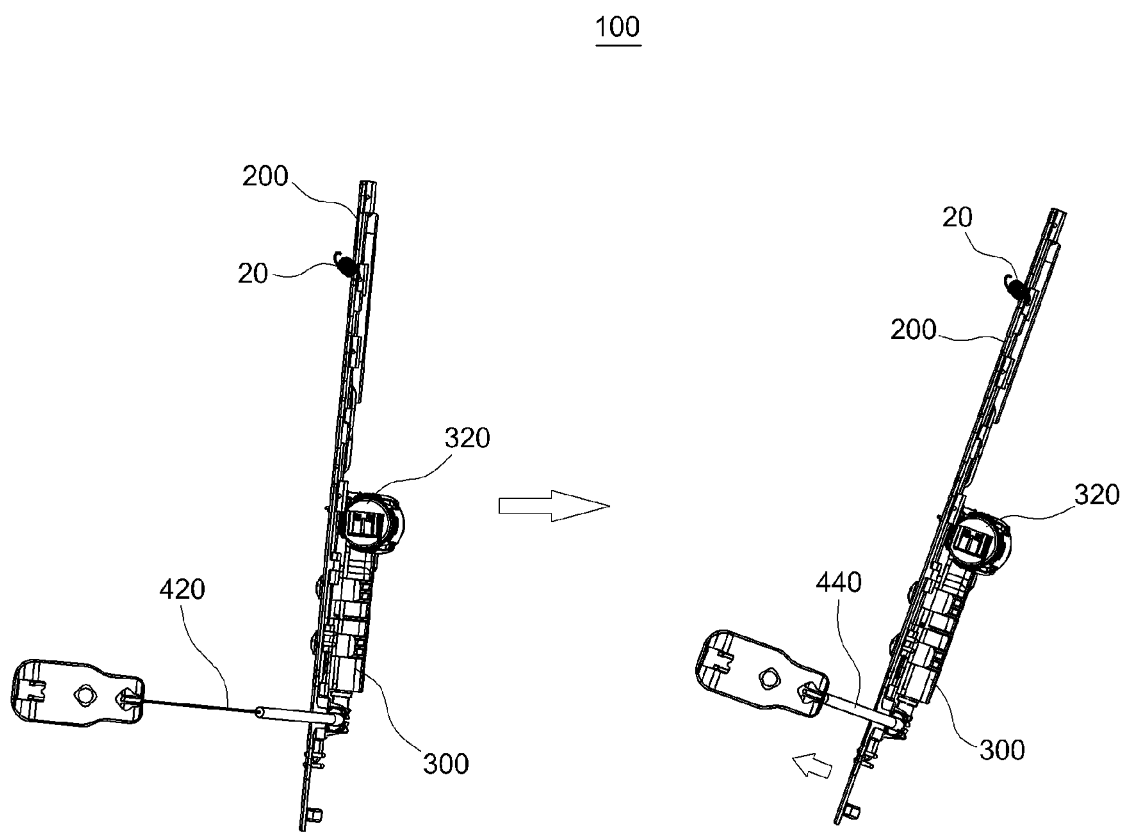

[Fig. 8]
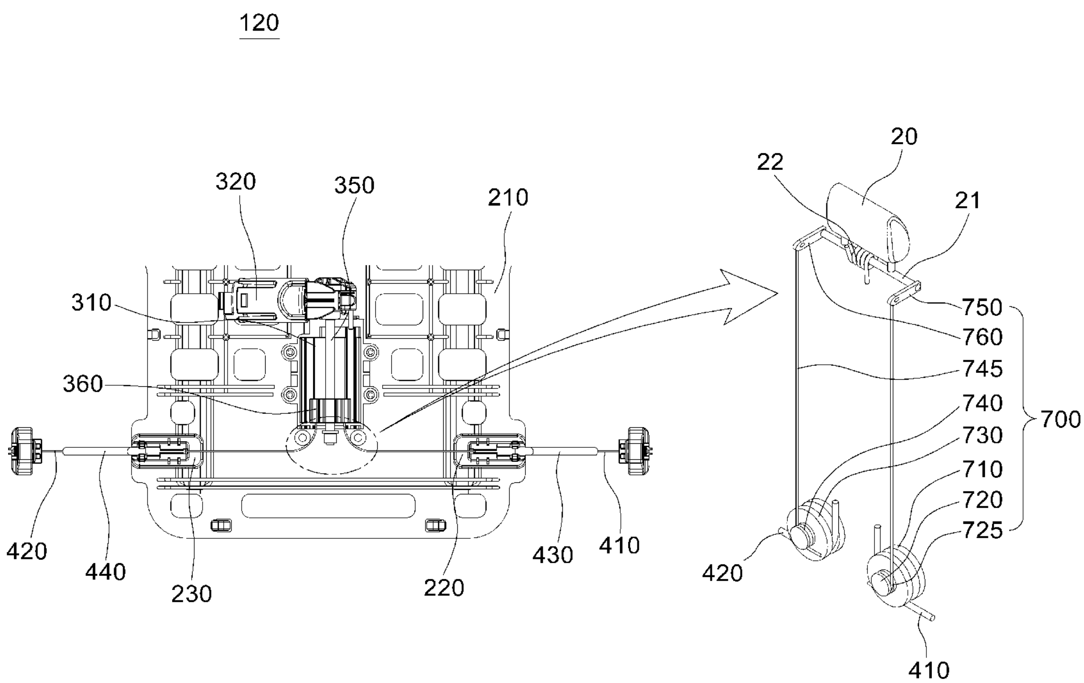

LUMBAR SUPPORT ASSEMBLY

CROSS REFERENCE TO RELATED APPLICATION

The present application claims priority to Korean Patent Application No. 10-2019-0064562, filed May 31, 2019, the entire contents of which is incorporated herein for all purposes by this reference.

BACKGROUND OF THE INVENTION

Field of the Invention

The disclosure relates generally to a lumbar support assembly and, more particularly, to a lumbar support assembly coupled to a seat frame of a vehicle to support a user's upper body.

Description of the Related Art

Unless otherwise indicated herein, the descriptions set forth in this identification are not the related art to the claims of this application and are not to be recognized as the related art as described herein.

A vehicle seat may be equipped with a seat cushion that supports buttocks of an occupant, a seat back that supports a back of the occupant, an armrest on which the occupant can rest his/her arms, and a headrest that supports a head of the occupant, and is configured to be adjustable to a shape suitable for the occupant through control of the occupant.

In the case of a lumbar support device supporting both sides of an upper body of the occupant, products having various structures are being manufactured or studied, but it is necessary to reduce weight by manufacturing same with as few components as possible in order to increase performance and fuel efficiency of a vehicle.

In this regard, Korean Patent No. 10-1725413 discloses an apparatus for seat side bolster of a vehicle, and Korean Patent No. 10-1598960 discloses a lumbar support for a vehicle.

However, these existing inventions do not appear to be an invention that minimizes weight and improves performance by reducing the number of components constituting a lumbar support.

The foregoing is intended merely to aid in the understanding of the background of the present invention, and is not intended to mean that the present invention falls within the purview of the related art that is already known to those skilled in the art.

DOCUMENT OF RELATED ART (Patent document 1) Korean Patent No. 10-1725413
(Patent document 2) Korean Patent No. 10-1598960

SUMMARY OF THE INVENTION

Accordingly, the present invention has been made keeping in mind the above problems occurring in the related art, and an objective of the present invention is to provide a lumbar support assembly, wherein the inclination of a mat is controlled by upward and downward movement of a single nut, thereby making it possible to reducing weight and manufacturing cost of the assembly.

The objectives of the present invention are not limited to the above-mentioned objective, and further objectives will be derived from the following description.

In order to achieve the above objective, according to one aspect of the disclosure, there is provided a lumbar support assembly, including: a mat having opposite sides that are rotatably connected to opposite sides of a seat frame, respectively; a driving unit coupled to the mat, and including a nut that is configured to be moved upward and downward; and a tension unit having first and second sides that are respectively coupled to the first and second sides of the seat frame, and coupled to the nut while surrounding a rear portion of the mat, wherein the nut allows the mat to be moved frontward or rearward by pulling or loosening the tension unit according to direction of movement.

Furthermore, the tension unit may include first and second cables configured such that each of the first and second cables has a first end and a second end, the respective first ends are respectively coupled to the opposite sides of the seat frame, and the respective second ends extend toward the rear portion of the mat and are respectively coupled to first and second sides of the nut.

Furthermore, the driving unit may further include a driving shaft having a first end that is gear-connected to a motor coupled to the mat, and a second end that extends downward and is screwed to the nut while passing through the nut.

Furthermore, the driving unit may further include: a first casing coupled to the mat at a position between the mat and the driving shaft, being in close contact with the nut, and formed to surround the nut and the driving shaft; and a second casing coupled to the first casing while being in close contact with the nut at a rear portion of the first casing, and having a hole formed at each side of a lower surface thereof and in which each of the first and second cables is inserted.

Furthermore, the mat may include first and second slots respectively coupled to the opposite sides of the mat and formed to respectively surround the first and second cables.

Furthermore, the tension unit may further include first and second protective covers formed to surround outer surfaces of the first and second cables in a cylindrical shape at respective positions between the first cable and the first slot and between and the second cable and the second slot.

The lumbar support assembly may further include a connecting part coupled to the mat at a position below of the nut, and including a first roller that is configured such that the tension unit is wound on a part of a lower portion thereof, a second roller that is coupled to a rear portion of the first roller, and a support that is coupled to a rotary shaft disposed below a headrest, extends rearward, and is connected to a wire wound on the second roller.

According to the embodiment disclosed herein, the lumbar support assembly has an effect that the mat can be moved only by upward and downward movement of a single nut to support an occupant's upper body, and that it can be easy to detach and attach cables, thereby facilitating maintenance.

Furthermore, the lumbar support assembly has an effect that the inclination of the mat can be controlled only by the operation of pulling upward the cables connected to the opposite sides thereof, and that the number of components constituting the assembly can be relatively reduced, thereby achieving weight reduction.

The effects of the present invention are naturally exhibited from the specification of the present invention irrespective of whether the inventors recognize the effects of the present invention. Consequently, the effects of the present invention are some effects of the present invention based on the specification of the present invention, and do not include all effects that the inventors have found or that actually exist.

In addition, the effects of the present invention are further recognized through the specification of the present invention. Although not described clearly, any effects that can be recognized by those skilled in the art to which the present invention pertains from the specification of the present invention may be included in the effects of the present invention.

BRIEF DESCRIPTION OF THE DRAWINGS

The above and other objectives, features, and other advantages of the present invention will be more clearly understood from the following detailed description when taken in conjunction with the accompanying drawings, in which:

FIG. 1 is a rear view illustrating a lumbar support assembly according to one embodiment disclosed in the present specification;

FIG. 2 is a perspective view illustrating the lumbar support assembly of FIG. 1 when viewed from a different angle;

FIG. 3 is an exploded perspective view illustrating the lumbar support assembly of FIG. 1;

FIG. 4 illustrates perspective views illustrating a nut of FIG. 2 when viewed from different angles;

FIG. 5 is a sectional view taken along line I-I' of FIG. 2;

FIG. 6 illustrates perspective views illustrating slots of FIG. 1;

FIG. 7 illustrates side views illustrating the operation of the lumbar support assembly of FIG. 1; and FIG. 8 is a rear view illustrating a lumbar support assembly according to another embodiment disclosed in the present specification.

DETAILED DESCRIPTION OF THE INVENTION

Hereinafter, the configuration, operation, and effect of a lumbar support according to exemplary embodiments will be described with reference to the accompanying drawings. For reference, in the figures, each component is omitted or schematically illustrated for convenience and clarity of illustration, and the size of each component does not completely reflect a real size. Further, the same reference numerals are used throughout the different drawings to designate the same or similar components. In the individual drawings, reference numerals for the same components will be omitted.

FIG. 1 illustrates a rear view illustrating a lumbar support assembly according to one embodiment disclosed in the present specification. FIG. 2 illustrates a perspective view illustrating the lumbar support assembly of FIG. 1 when viewed from a different angle. FIG. 3 illustrates an exploded perspective view illustrating the lumbar support assembly of FIG. 1.

As illustrated in FIGS. 1 to 3, a lumbar support assembly 100 includes a mat 200, a driving unit 300, and a tension unit 400.

The lumbar support assembly 100 is configured to improve fuel efficiency of a vehicle by relatively reducing the number, volume, and weight of components constituting the driving unit 300, and provide a seat position suitable for physical condition of an occupant by controlling frontward or rearward movement of a lower portion of the mat 200.

The mat 200 has a first end formed at an upper portion thereof, and first and second sides of the mat 200 are respectively coupled to first and second sides of a seat frame by springs 20 provided at opposite sides of the upper portion. The mat 200 has a second end extending downward in a plate shape and connected to the seat frame by the tension unit 400.

In detail, the mat 200 includes a body 210, a first slot 220, and a second slot 230.

The body 210 has a first end that is formed in a plate shape extending upward or downward, with a plurality of quadrangular hollow holes passing through front and rear surfaces of the body 210 to be spaced apart from each other in a lattice shape.

The body 210 has a second end that extends downward from the first end by a predetermined distance in a plate shape, with the first and second slots 220 and 230 respectively formed at first and second sides of a rear portion of the second end and connected to the tension unit 400.

The first slot 220 is formed at a first side of the second end of the body 210 such that a front portion thereof is formed in a plate shape and coupled to the body 210, and a rear portion thereof extends rearward from the front portion in a shape surrounding an oppositely elongated cylindrical space and surrounds a first protective cover 430 which will be described later.

The second slot 230 is formed at a second side of the second end of the body 210 such that a front portion thereof is formed in a plate shape and coupled to the body 210, and a rear portion thereof extends rearward from the front portion in a shape surrounding an oppositely elongated cylindrical space and surrounds a second protective cover 440 which will be described later.

Referring to FIGS. 1 and 2, the driving unit 300 includes a first casing 310, a motor 320, a rotary shaft 325, a worm 330, a worm gear 340, a driving shaft 350, and nuts 360.

The driving unit 300 is coupled to a rear portion of a second end of the mat 200 and is configured to pull cables connected to the opposite sides of the seat frame by forward rotation operation to cause the second end of the mat 200 to be moved frontward by means tension of the cables.

On the contrary, when the driving unit 300 loosens the cables connected to the opposite sides of the seat frame by reverse rotation operation and controls the tension of the cables to a relatively low level, the second end of the mat 200 is moved rearward in response to the load of the occupant.

The first casing 310 is formed in a plate shape and is coupled to the rear portion of the body 210. The first casing 310 protrudes rearward and is configured such that ribs of a shape extending long upward or downward are formed spaced apart from each other at a first side and a second side of a rear surface thereof to form a groove 312 in a center of the rear surface.

The motor 320 is coupled to a rear portion of a second side of the mat 200 and is formed in a shape extending toward a first side or a second side in a cylindrical shape. The motor 320 is configured such that the rotary shaft 325 formed at a second side thereof extends toward the second side by a predetermined distance and is coupled to the worm 330.

The worm 330 has a first side coupled to the rotary shaft 325. The worm 330 has a front surface meshed with an outer surface of the worm gear 340 disposed in front of the worm 330. The worm 330 is configured to be rotated in cooperation with the direction of rotation of the rotary shaft 325 while rotating the worm gear 340 in a forward or reverse direction.

The worm gear 340 is disposed between in front of the worm 330 and the body 210, and has a central lower portion coupled to the driving shaft 350 disposed therebelow. The worm gear 340 is configured to be rotated in the forward or reverse direction in cooperation with the direction of rotation of the worm 330.

The driving shaft 350 has a first end that is coupled to the central portion of the worm gear 340, and a second end that extends from the first end downward by a predetermined distance in a cylindrical shape with a thread formed on an outer side thereof and is screwed to a nut 360 while passing through the nut 360 from top to bottom.

The nut 360 is formed in a rectangular parallelepiped shape and is screwed to the driving shaft 350 at a rear portion of the first casing 310. The nut 360 is configured such that a part of a front portion thereof is inserted into the groove 312 so that the nut 360 is slidable upward or downward along the first casing 310.

When a second casing 370 which will be described later is coupled to the first casing 310, the nut 360 is moved upward or downward in cooperation with forward or reverse rotation of the driving shaft 350, between the first and second casings 310 and 370.

Due to the fact that the front and rear portions of the nut 360 are respectively in close contact with the first and second casings 310 and 370, the nut 360 is moved upward or downward rather than being rotated in cooperation with forward or reverse rotation of the driving shaft 350.

The second casing 370 is formed in a rectangular cap shape that is coupled to the first casing 310 while covering the driving shaft 350 and the nut 360 at the rear portion of the first casing 310. The second casing 370 is configured such that ribs of a shape extending long upward or downward are formed spaced apart from each other at a first side and a second side of a front surface thereof to form a groove 372 in a center of the front surface.

The front and rear portions of the nut 360 are partially inserted into the grooves 312 and 372, respectively, in a state in which the second casing 370 is coupled to the first casing 310, and the nut 360 is slidable upward or downward along the respective grooves 312 and 372.

Holes 374 and 375 are respectively formed at a first side and a second side of a lower surface of the second casing 370 by respectively passing through the first and second sides of the lower surface of the second casing 370 from top to bottom in a state in which the first and second casings 310 and 370 are coupled to each other.

The tension unit 400 includes a first cable 410, a second cable 420, a first protective cover 430 and a second protective cover 440.

The tension unit 400 is coupled to a first side and a second side of a lower portion of the seat frame, and is coupled to the driving unit 300 while surrounding the rear portion of the second end of the mat 200 in a parabolic shape, thereby being formed in a shape connecting the first and second sides of the seat frame to each other.

The tension unit 400 is configured such that when the tension unit 400 is pulled taut by forward rotation operation of the driving unit 300, the tension unit 400 is unfolded in a straight line in opposite directions to come into close contact with the second end of the mat 200, thereby causing the second end of the mat 200 to be moved frontward to support an upper body of the occupant.

On the contrary, when the tension unit 400 is loosened in opposite directions by reverse rotation operation of the driving unit 300, a supporting force supporting the rear portion of the second end of the mat 200 is released, and the second end of the mat 200 is moved rearward in response to the load of the occupant.

In detail, the first cable 410 has a first end coupled to a first frame of the seat frame located at the first side of the body 210, and a second end extending toward a second side, passing through the first slot 220, and coupled to a first side of a lower portion of the nut 360 while surrounding the first side of the rear portion of the second end of the body 210.

The second cable 420 has a first end coupled to a second frame of the seat frame located at the second side of the body 210, and a second end extending toward a first side, passing through the second slot 230, and coupled to a second side of the lower portion of the nut 360 while surrounding the second side of rear portion of the second end of the body 210.

Therefore, when the driving shaft 350 is rotated forward by the operation of the motor 320, the nut 360 is moved from the second end of the body 210 toward the first end of the body 210 to pull the second ends of the respective first and second cables 410 and 420, and the body 210 is moved frontward in response to the tension of the pulled first and second cables 410 and 420.

The first protective cover 430 is formed in a cylindrical shape surrounding an outer surface of the first cable 410 and is coupled to the first cable 410. The first protective cover 430 is disposed between the rear portion of the first slot 220 into which the first cable 410 is inserted and the outer surface of the first cable 410 to prevent wear of the first cable 410 moved by the nut 360.

The second protective cover 440 is formed in a cylindrical shape surrounding an outer surface of the second cable 420 and is coupled to the second cable 420. The second protective cover 440 is disposed between the rear portion of the second slot 230 into which the second cable 420 is inserted and the outer surface of the second cable 420 to prevent wear of the second cable 420 moved by the nut 360.

FIG. 4 illustrates perspective views illustrating the nut of FIG. 2 when viewed from different angles. FIG. 5 illustrates a sectional view taken along line I-I' of FIG. 2. FIG. 6 illustrates perspective views illustrating the slots of FIG. 1.

Referring to FIG. 4, a frame 351 of the nut 360 is formed in a rectangular parallelepiped shape extending long toward a first side or a second side, and a space passing through each of first and second sides of the nut 360 from top to bottom or bottom to top is formed such that first and second couplers of a cylindrical shape respectively formed at the second ends of the second cables 410 and 420 are inserted into the respective spaces.

A hollow hole 352 of a cylindrical shape passing through upper and lower portions of the frame 351 is formed in a center of the frame 351, and an inner surface of the frame 351 located in the hollow hole 352 is screwed to an outer surface of the driving shaft 350 inserted into the hollow hole 352.

A first coupling groove 353 is recessed downward from an upper portion of a first side of the frame 351 by a predetermined distance in a cylindrical shape so that an upper portion of the first coupling groove 353 is connected to outside. A part of the upper portion of the first side of the frame 351 is recessed toward the first coupling groove 353 to form a first-first side passage allowing the first coupling groove 353 and a space corresponding to the first side of the frame 351 to be connected to each other.

A second coupling groove 354 is recessed upward from a lower portion of the first side of the frame 351 in a cylindrical shape relatively smaller in size than the first coupling groove 353 so that the second coupling groove 354 is connected to the first coupling groove 353. A part of the lower portion of the first side of the frame 351 is recessed toward the second coupling groove 354 to form a second-first side passage allowing the second coupling groove 354 and the space corresponding to the first side of the frame 351 to be connected to each other.

The respective first and second-first side passages are connected to each other to form a first side passage. The first side passage allows the first cable 410 except for the first coupler to be inserted into the first coupling groove 353 and the second coupling groove 354 through the first side passage from the first side of the frame 351.

When the first cable 410 is moved downward by a predetermined distance while being inserted into the first coupling groove 353 and the second coupling groove 354, the first coupler of the first cable 410 inserted into the first coupling groove 353 thereby causing the second end of the first cable 410 to be coupled to the frame 351.

Due to the fact that the first coupler is formed relatively larger in size than the space of the second coupling groove 354, the first coupler can be moved upward while being inserted into the first coupling groove 353, but is restricted from being moved downward through the second coupling groove 354.

A third coupling groove 355 is recessed downward from an upper portion of a second side of the frame 351 by a predetermined distance in a cylindrical shape so that an upper portion of the third coupling groove 355 is connected to outside. A part of the upper portion of the second side of the frame 351 is recessed toward the third coupling groove 355 to form a first-second side passage allowing the third coupling groove 355 and a space corresponding to the second side of the frame 351 to be connected to each other.

A fourth coupling groove 356 is recessed upward from a lower portion of the second side of the frame 351 in a cylindrical shape relatively smaller in size than the third coupling groove 355 so that the fourth coupling groove 356 is connected to the third coupling groove 355. A part of the lower portion of the second side of the frame 351 is recessed toward the fourth coupling groove 356 to form a second-second side passage allowing the fourth coupling groove 356 and the space corresponding to the second side of the frame 351 to be connected to each other.

The respective first and second-second side passages are connected to each other to form a second side passage. The second side passage allows the second cable 420 except for the second coupler to be inserted into the third coupling groove 355 and the fourth coupling groove 356 through the second side passage from the second side of the frame 351.

When the second cable 420 is moved downward by a predetermined distance while being inserted into the third coupling groove 355 and the fourth coupling groove 356, the second coupler of the second cable 420 inserted into the third coupling groove 355 thereby causing the second end of the second cable 420 to be coupled to the frame 351.

Due to the fact that the second coupler is formed relatively larger in size than the space of the fourth coupling groove 356, the second coupler can be moved upward while being inserted into the third coupling groove 355, but is restricted from being moved downward through the fourth coupling groove 356.

Front ribs 357 and 358 protrude frontward by a predetermined distance in a bar shape in which the ribs 357 and 358 extend long upward or downward from a first side and a second side of a front surface of the frame 351, respectively. Rear ribs 359 and 361 protrude rearward by a predetermined distance in a bar shape in which the ribs 359 and 361 extend long upward or downward from a first side and a second side of a rear surface of the frame 351, respectively.

As illustrated in FIG. 5, the first coupler formed at the second end of the first cable 410 is inserted into the first coupling groove 353 and coupled to the frame 351, and the second coupler formed at the second end of the second cable 420 is inserted into the third coupling groove 355 and coupled to the frame 351.

The front ribs 357 and 358 are inserted into the groove 312 to be in close contact with the rear surface of the first casing 310, and the rear ribs 359 and 361 are inserted into the groove 372 to be in close contact with the front surface of the second casing 370.

The driving shaft 350 is inserted into the hollow hole 352, and the outer surface of the driving shaft 350 is screwed to the inner surface of the frame 351 located in the hollow hole 352 so that the frame 351 is moved toward upward or downward in cooperation with the direction of rotation of the driving shaft 350.

Referring to FIGS. 1 and 6, the first slot 220 includes a cover 222, a locking pin 224, and a locking pin 225, and the second slot 230 includes a cover 232, a locking pin 234, and a locking pin 235.

The cover 222 has a front portion formed in a plate shape and coupled to a rear surface of the body 210, and a rear portion extending in a plate shape in which a part of each of upper and lower portions of a second side of the front portion surrounds each of upper and lower portions of the first protective cover 430, and being in close contact with a part of the first protective cover 430.

The locking pin 224 has a first end coupled to a rear surface of the front portion of the cover 222 corresponding to a first side of the rear portion of the cover 222, and a second end extending rearward by a predetermined distance and bent at a part of a distal portion thereof frontward and downward to extend inclinedly by a predetermined distance.

The locking pin 225 has a first end coupled to the rear surface of the front portion of the cover 222 at a position below the locking pin 224, and a second end extending rearward by a predetermined distance and bent at a part of a distal portion thereof frontward and upward to extend inclinedly by a predetermined distance.

Therefore, a part of the first protective cover 430 is inserted and coupled to the rear portion of the cover 222, with the first cable 410 covered by the first protective cover 430, and a remaining part of the first protective cover 430 is moved frontward between the second ends of the respective locking pins 224 and 225 and is inserted and locked to front portions of the second ends of the respective locking pins 224 and 225.

The cover 232 has a front portion formed in a plate shape and coupled to the rear surface of the body 210, and a rear portion extending in a plate shape in which a part of each of upper and lower portions of a first side of the front portion surrounds each of upper and lower portions of the second protective cover 440, and being in close contact with a part of the second protective cover 440.

The locking pin 234 has a first end coupled to a rear surface of the front portion of the cover 232 corresponding to a second side of the rear portion of the cover 232, and a second end extending rearward by a predetermined distance and bent at a part of a distal portion thereof frontward and downward to extend inclinedly by a predetermined distance.

The locking pin 235 has a first end coupled to the rear surface of the front portion of the cover 232 at a position below the locking pin 234, and a second end extending rearward by a predetermined distance and bent at a part of a distal portion thereof frontward and upward to extend inclinedly by a predetermined distance.

Therefore, a part of the second protective cover 440 is inserted and coupled to the rear portion of the cover 232, with the second cable 420 covered by the second protective cover 440, and a remaining part of the second protective cover 440 is moved frontward between the second ends of the respective locking pins 234 and 235 and is inserted and locked to front portions of the second ends of the respective locking pins 234 and 235.

FIG. 7 illustrates side views illustrating the operation of the lumbar support assembly of FIG. 1.

Referring to FIGS. 3 and 7, when the motor 320 is operated to rotate the worm 330 in the forward direction, the worm gear 340 and the driving shaft 350 are rotated in the forward direction, and the nut 360 is moved upward to pull the first and the second cables 410 and 420 upward.

As the second ends of the respective first and second cables 410 and 420 are moved upward, the second end of the body 210 is moved frontward in response to the tension of the first and second cables 410 and 420 in proportion to the distance that the first and second cables 410 and 420 are moved upward.

On the contrary, when the motor 320 is operated to rotate the worm 330 in the reverse direction, the worm gear 340 and the driving shaft 350 are rotated in the reverse direction, and the nut 360 is moved downward so that the second ends of the respective first and the second cables 410 and 420 are moved downward and the first and the second cables 410 and 420 transition to a loosened state.

As the first and second cables 410 and 420 are loosened, the second end of the body 410 moved frontward in response to the tension of the first and second cables 410 and 420 is moved rearward in response to the load of the occupant, the elastic force of the springs 20, or the weight of the body 210.

Therefore, the lumbar support assembly 100 can stably support a lumbar of the occupant by the operation of a single motor 320 and a single nut 360, and can enable reduced manufacturing cost and weight thereof and thereby being cost effective.

FIG. 8 is a rear view illustrating a lumbar support assembly according to another embodiment disclosed in the present specification.

The lumbar support assembly 120 according to the present embodiment remains substantially the same as the lumbar support assembly 120 of FIGS. 1 to 7 except for a rotary shaft 21, a spring 22, and a connecting part 700, and thus the same reference numerals will be used and a duplicate description will be omitted.

The lumbar support assembly 120 further includes the rotary shaft 21, the spring 22, and the connecting part 700.

The rotary shaft 21 is formed in a bar shape extending long toward a first side or a second side and is coupled to a lower portion of a headrest 20. The rotary shaft 21 has opposite ends connected to the connecting part 700 so that the rotary shaft 21 is rotated about the direction of extension in cooperation with the operation of the connecting part 700.

The spring 22 is formed in a shape of a torsion spring. The spring 22 is formed to surround the rotary shaft 21 at a position below the headrest 20. The spring 22 is configured such that a lower portion of a first end thereof is coupled to the seat frame and an upper portion of a second end thereof is coupled to the headrest 20.

Therefore, the spring 22 is configured to be twisted to provide elastic force to the headrest 20 when the rotary shaft 21 is rotated in the forward direction in cooperation with the operation of the connecting part 700 so that the rotary shaft 21 is rotated in the reverse direction.

The connecting part 700 includes a first roller 710, a second roller 720, a first wire 725, a third roller 730, a fourth roller 740, a second wire 745, and a first support 750 and a second support 760.

The connecting part 700 has a first end formed in a shape of a roller and coupled to a rear surface of a body 210 at a position below a first casing 310 so as to be rotatable with respect to the front and rear axis, and wires wound on a rear portion of the first end are connected to opposite sides of the rotary shaft 21. The connecting part 700 is configured to rotate the rotary shaft 21 by pulling the wires when first and second cables 410 and 420 are moved upward in cooperation with the operation of a nut 360.

The first roller 710 is coupled to the rear surface of the body 210 at a position corresponding to a first side below the first casing 310 so as to be rotatable with respect to the front and rear axis, and a second end of the first cable 410 extends upward to be in close contact with a lower portion and a second side of the first roller 710 and is coupled to the nut 360.

The second roller 720 is a relatively smaller roller than the first roller 710. The second roller 720 is configured such that a circular front portion thereof is coupled to a center of a rear portion of the first roller 710, and an outer surface thereof is provided with a groove to which the first wire 725 is wound and coupled.

The first wire 725 has a first end that is inserted into the groove formed in the outer surface of the second roller 720 and is wound and coupled to the second roller 720, and a second end that extends upward from a first side of the second roller 720 and is connected to the first support 750 coupled to the first end of the rotary shaft 21.

The first support 750 has a first end coupled to the first end of the rotary shaft 21, and a second end extending rearward by a predetermined distance in a bar shape and coupled to the second end of the first wire 725. The first support 750 is configured to be rotated when the first wire 725 is moved downward, causing the headrest 20 to be moved rearward.

The third roller 730 is coupled to the rear surface of the body 210 at a position corresponding to a second side below the first casing 310 so as to be rotatable with respect to the front and rear axis, and a second end of the second cable 420 extends upward to be in close contact with a lower portion and a first side of the third roller 730 and is coupled to the nut 360.

The fourth roller 740 is a relatively smaller roller than the third roller 730. The fourth roller 740 is configured such that a circular front portion thereof is coupled to a center of a rear portion of the third roller 730, and an outer surface thereof is provided with a groove to which the second wire 745 is wound and coupled.

The second wire 745 has a first end that is inserted into the groove formed in the outer surface of the fourth roller 740 and is wound and coupled to the fourth roller 740, and a second end extending upward from a second side of the fourth roller 740 and connected to the second support 760 coupled to the second end of the rotary shaft 21.

The second support 760 has a first end coupled to the second end of the rotary shaft 21, and a second end extending rearward by a predetermined distance in a bar shape and coupled to the second end of the second wire 745. The second support 760 is configured to be rotated when the second wire 745 is moved downward, causing the headrest 20 to be moved rearward.

Therefore, when the nut 360 is moved upward and the first and second cables 410 and 420 are moved upward thereby, the first and third rollers 710 and 730 are rotated clockwise and counterclockwise, respectively, when the first and third rollers 710 and 730 are viewed from rear.

Furthermore, when first and third rollers 710 and 730 are rotated clockwise and counterclockwise, respectively, the second and fourth rollers 720 and 740 are rotated clockwise and counterclockwise, respectively, while pulling the first and second wires 725 and 745 downward.

As a result, when the nut 360 is moved upward and the second end of the body 210 is moved forward thereby, an occupant's head is moved rearward with the occupant's lumbar supported. At this time, the headrest 20 is automatically moved rearward by the connecting part 700, thereby comfortably supporting the occupant's head.

While the exemplary embodiments of the invention have been described above, specific structural and functional descriptions of the embodiments of the present invention disclosed herein are only for illustrative purposes of the embodiments of the present invention, and the present description is not intended to represent all of the technical spirit of the present invention. On the contrary, various modifications, equivalents, additions, and substitutions are possible, without departing from the scope and spirit of the invention. Therefore, the embodiments of the present invention have been described for illustrative purposes, and should not be construed as being restrictive. The scope of the present invention is defined by the accompanying claims rather than the description which is presented above. Accordingly, various alternatives, modifications, equivalents, and other embodiments that may be included within the spirit and scope of the present invention as defined by the appended claims.

What is claimed is:

1. A lumbar support assembly, comprising:

a mat having opposite sides that are rotatably connected to opposite sides of a seat frame, respectively;

a driving unit coupled to the mat, and including a nut that is configured to be moved upward and downward; and a tension unit having first and second sides that are respectively coupled to the first and second sides of the seat frame, and coupled to the nut while surrounding a rear portion of the mat, wherein the nut allows the mat to be moved frontward or rearward by pulling or loosening the tension unit according to direction of movement, wherein the tension unit comprises first and second cables configured such that each of the first and second cables has a first end and a second end, the respective first ends are respectively coupled to the opposite sides of the seat frame, and the respective second ends extend toward the rear portion of the mat and are respectively coupled to the nut, wherein the driving unit further comprises a driving shaft having a first end that is gear-connected to a motor coupled to the mat, and a second end that extends downward and is screwed to the nut while passing through the nut, wherein the driving unit further comprises:

a first casing coupled to the mat at a position between the mat and the driving shaft, being in close contact with the nut, and formed to surround the nut and the driving shaft; and a second casing coupled to the first casing while being in close contact with the nut at a rear portion of the first casing, wherein the nut further comprises:

a first coupling groove formed such that a first coupler formed at the second end of the first cable is inserted and a second coupling groove connected to the first coupling groove formed such that the first coupler inserted into the first coupling groove is restricted from being moved through the second coupling groove, wherein the first coupling groove has a first-first side passage and the second coupling groove has a second-first side passage which together form a first side passage which allows the first cable except for the first coupler to be inserted into the first coupling groove and the second coupling groove through the first side passage from a first side of the nut; and a third coupling groove formed such that a second coupler formed at the second end of the second cable is inserted and a fourth coupling groove connected to the third coupling groove formed such that the second coupler inserted into the third coupling groove is restricted from being moved through the fourth coupling groove, wherein the third coupling groove has a first-second side passage and the fourth coupling groove has a second-second side passage which together form a second side passage which allows the second cable except for the second coupler to be inserted into the third coupling groove and the fourth coupling groove through the second side passage from a second side of the nut.

2. The lumbar support assembly of claim 1, wherein the mat comprises first and second slots respectively coupled to the opposite sides of the mat and formed to respectively surround the first and second cables.

3. The lumbar support assembly of claim 2, wherein the tension unit further comprises first and second protective covers formed to surround outer surfaces of the first and second cables in a cylindrical shape at respective positions between the first cable and the first slot and between and the second cable and the second slot.

4. The lumbar support assembly of claim 1, further comprising:

a connecting part coupled to the mat at a position below the nut, and including a first roller that is configured such that the tension unit is wound on a part of a lower portion thereof, a second roller that is coupled to a rear portion of the first roller, and a support that is coupled to a rotary shaft disposed below a headrest, extends rearward, and is connected to a wire wound on the second roller.

5. A lumbar support assembly, comprising:

a mat having opposite sides that are rotatably connected to opposite sides of a seat frame, respectively;

a driving unit coupled to the mat, and including a nut that is configured to be moved upward and downward;

a tension unit having first and second sides that are respectively coupled to the first and second sides of the seat frame, and coupled to the nut while surrounding a rear portion of the mat; and a connecting part coupled to the mat at a position below the nut, and including a first roller that is configured such that the tension unit is wound on a part of a lower portion thereof, a second roller that is coupled to a rear portion of the first roller, and a support that is coupled to a rotary shaft disposed below a headrest, extends rearward, and is connected to a wire wound on the second roller, wherein the nut allows the mat to be moved frontward or rearward by pulling or loosening the tension unit according to direction of movement.

* * * * *